(12) United States Patent
Lee et al.

(10) Patent No.: US 8,669,679 B2
(45) Date of Patent: Mar. 11, 2014

(54) LINEAR VIBRATOR

(75) Inventors: Kyung Ho Lee, Gyunggi-do (KR);
Young Nam Hwang, Gyunggi-do (KR);
Po Chul Kim, Gyunggi-do (KR); Yong Jin Kim, Gyunggi-do (KR)

(73) Assignee: Samsung Electro-Mechanics Co., Ltd., Suwon (KR)

(*) Notice: Subject to any disclaimer, the term of this patent is extended or adjusted under 35 U.S.C. 154(b) by 129 days.

(21) Appl. No.: 13/352,911

(22) Filed: Jan. 18, 2012

(65) Prior Publication Data
US 2013/0088100 A1    Apr. 11, 2013

(30) Foreign Application Priority Data

Oct. 10, 2011    (KR) .................. 10-2011-0102955

(51) Int. Cl.
*H02K 33/00*    (2006.01)

(52) U.S. Cl.
USPC ............................................ 310/25; 310/15

(58) Field of Classification Search
USPC .......................................... 310/15, 25, 14, 36
See application file for complete search history.

(56) References Cited

U.S. PATENT DOCUMENTS

| 5,528,697 | A | * | 6/1996 | Saito | ............................... 381/396 |
| 7,038,335 | B2 | * | 5/2006 | Choi et al. | ................. 310/12.24 |
| 2011/0018369 | A1 | | 1/2011 | So | |

FOREIGN PATENT DOCUMENTS

| JP | 6-52092 U | 7/1994 |
| JP | 2011-025221 | 2/2011 |

* cited by examiner

*Primary Examiner* — Nguyen N Hanh
(74) *Attorney, Agent, or Firm* — McDermott Will & Emery LLP

(57) ABSTRACT

There is provided a linear vibrator, including: a fixed part providing an interior space having a predetermined size; at least one magnet disposed in the interior space and generating magnetic force; a vibration part including a coil facing the magnet and generating electromagnetic force through interaction with the magnet and a mass body; and an elastic member coupled to the fixed part and the vibration part to mediate vibrations of the vibration part and having a damping increasing portion attached to a predetermined region of a surface thereof.

8 Claims, 5 Drawing Sheets

LINEAR VIBRATOR

CROSS-REFERENCE TO RELATED APPLICATIONS

This application claims the priority of Korean Patent Application No. 10-2011-0102955 filed on Oct. 10, 2011, in the Korean Intellectual Property Office, the disclosure of which is incorporated herein by reference.

BACKGROUND OF THE INVENTION

1. Field of the Invention

The present invention relates to a linear vibrator, and more particularly, to a linear vibrator capable of generating vibrations when mounted in a portable electronic device.

2. Description of the Related Art

Recently, the release of personal portable terminals having large LCD screens provided for user convenience has significantly, increased. Accordingly, a touch screen scheme has been adopted therein, and a vibration motor has been used so as to generate vibrations when a touch is applied to a touch screen.

The vibration motor converts electrical energy into mechanical vibrations using a principle of generating electromagnetic force, and is mounted in the personal portable terminal to be used for silent incoming signal notification.

In a vibration motor according to the related art, a method in which a rotation part of an unbalanced mass is rotated by generating rotational force to thereby obtain mechanical vibrations has been used, and the rotational force is subjected to a rectifying action via a contact point between a brush and a commutator to thereby obtain the mechanical vibrations.

However, a brush-type structure using the commutator may cause mechanical friction and electrical sparks as well as the generation of foreign objects when the brush passes through a clearance between segments of the commutator when the motor is rotated, so that the service life of the motor may be shortened.

In addition, since it takes time to reach an amount of target vibrations due to rotational inertia when voltage is applied to the motor, there may be a problem in which a sufficient amount of vibrations for the touch screen may not be implemented.

A linear vibrator is widely used to implement a vibration function in the touch screen, while overcoming disadvantages in the service life and response properties of the motor.

The linear vibrator does not use a motor rotation principle, but generates resonance by periodically generating, in accordance with resonant frequencies, electromagnetic force obtained through a spring installed inside the linear vibrator and a mass body suspended on the spring, thereby generating vibrations.

In the linear vibrator using the resonance phenomenon, the spring vibrates while being repetitively tensioned and compressed vertically, according to the resonant frequency thereof, under normal conditions, but the spring may vibrate in an undesired direction, rather than providing vertical movement, due to various factors.

This phenomenon may cause undesirable noise as the spring contacts a case to thereby generate noise.

Specifically, even if a desired resonant frequency is added to the linear vibrator, an undesired frequency may also be added to the linear vibrator, and as a result, a undesired mode, i.e., a surging mode in which only the spring vibrates independently of the mass body, may be generated.

When the surging mode occurs, the spring may contact the case, the mass body, or the like, independently of the mass body, and as a result, undesired noise may occur due to the contact.

Accordingly, research into improving the generation of noise by preventing contact between the spring and the case, and the spring and the mass body in the surging mode is urgently required.

SUMMARY OF THE INVENTION

An aspect of the present invention provides a linear vibrator that improves undesirable noise by preventing contact between an elastic member and a case, or the elastic member and a mass body in a surging mode, a specific mode of the elastic member generated in a high-frequency domain.

According to an aspect of the present invention, there is provided a linear vibrator, including: a fixed part providing an interior space having a predetermined size; at least one magnet disposed in the interior space and generating magnetic force; a vibration part including a coil facing the magnet and generating electromagnetic force through interaction with the magnet and a mass body; and an elastic member coupled to the fixed part and the vibration part to mediate vibrations of the vibration part and having a damping increasing portion attached to a predetermined region of a surface thereof.

The damping increasing portion may be coated on the elastic member.

The damping increasing portion may be made of a rubber material.

The damping increasing portion may include urethane.

The elastic member may include a fixed end portion coupled to the fixed part, a free end portion coupled to the vibration part, and at least one connection strip portion providing elastic force by connecting the fixed end portion and the free end portion to each other, and the damping increasing portion may be attached to a predetermined region of the at least one connection strip portion.

The linear vibrator may further include a substrate having one end coupled to the vibration part as a free end and the other end coupled to the fixed part as a fixed end, so as to apply power to the coil.

The fixed part may include a case providing the interior space and having an open bottom and a bracket sealing the interior space, and the magnet may be coupled to a surface of the bracket or a surface of the case.

The fixed part may include a case providing the interior space and having an open bottom and a bracket sealing the interior space, and the magnet may include a plurality of magnets and the plurality of magnets may be coupled to each of one surface of the case and one surface of the bracket.

According to another aspect of the present invention, there is provided a linear vibrator, including: a fixed part providing an interior space having a predetermined size and including a case having an open bottom and a bracket sealing the interior space; at least one magnet disposed in the interior space and generating magnetic force; a vibration part including a holder fixedly supporting a coil disposed to face the least one magnet to generate electromagnetic force through interaction with the magnet and a mass body; and an elastic member coupled to the fixed part and the vibration part to mediate vibrations of the vibration part and having a damping increasing portion made of a rubber material, coated on a predetermined region of a surface thereof.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
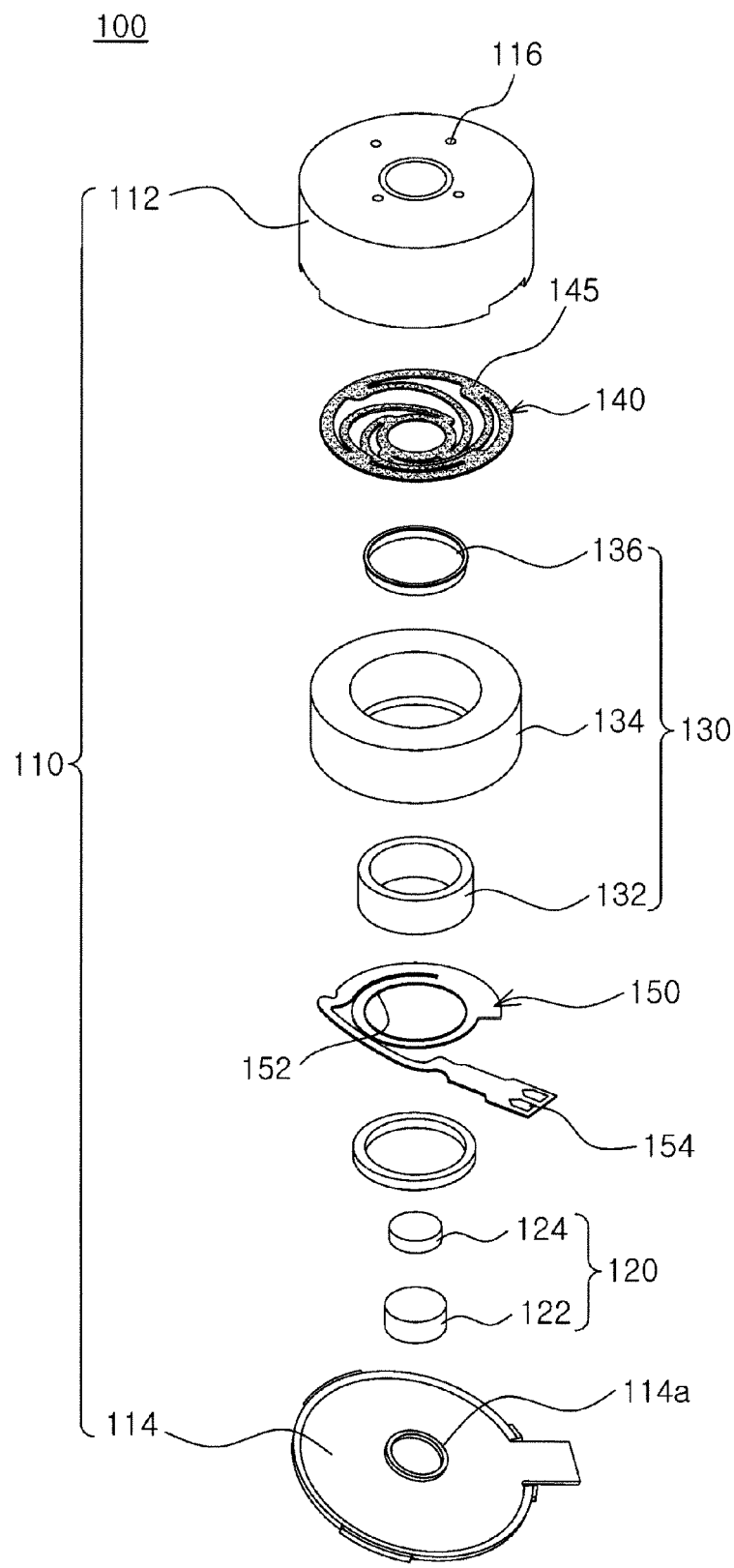
FIG. 1 is a schematic exploded perspective view of a linear vibrator according to an embodiment of the present invention.

Embodiments of the present invention will now be described in detail with reference to the accompanying drawings. However, it should be noted that the spirit of the present invention is not limited to the embodiments set forth herein and those skilled in the art and understanding the present invention could easily accomplish retrogressive inventions or other embodiments included in the spirit of the present invention by the addition, modification, and removal of components within the same spirit, but those are to be construed as being included in the spirit of the present invention.

Further, like reference numerals will be used to designate like components having similar functions throughout the drawings within the scope of the present invention.

Figure 2:
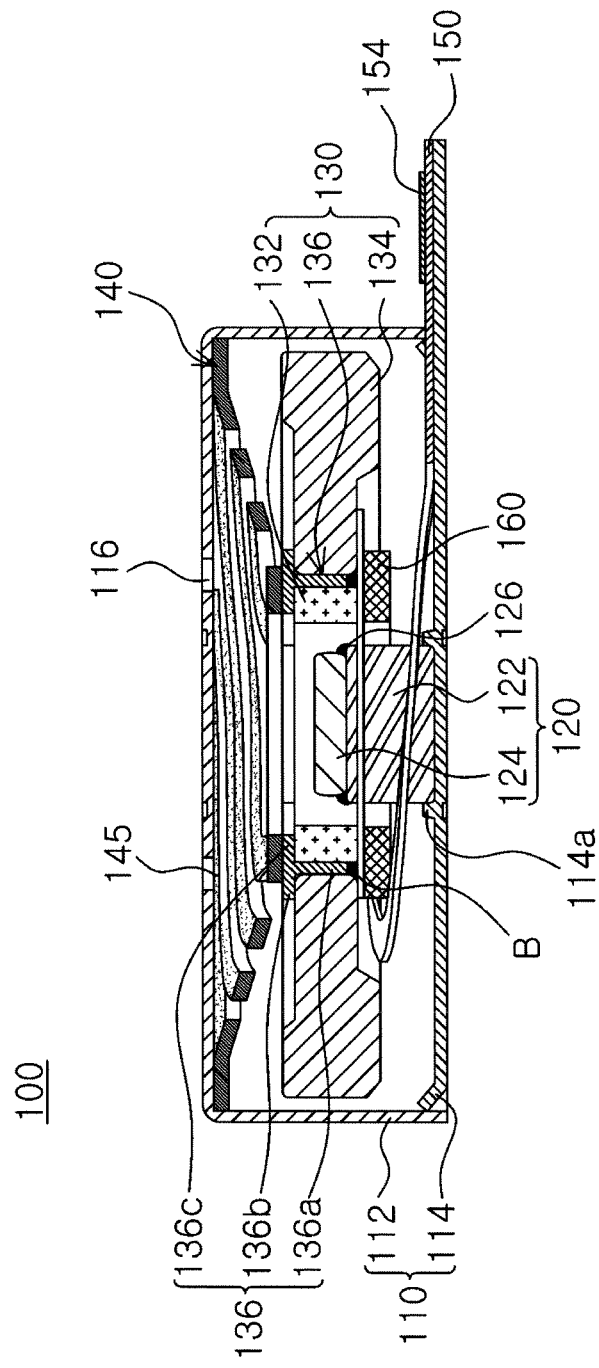
FIG. 2 is a schematic cross-sectional view of the linear vibrator according to the embodiment of the present invention.
Figure 3:
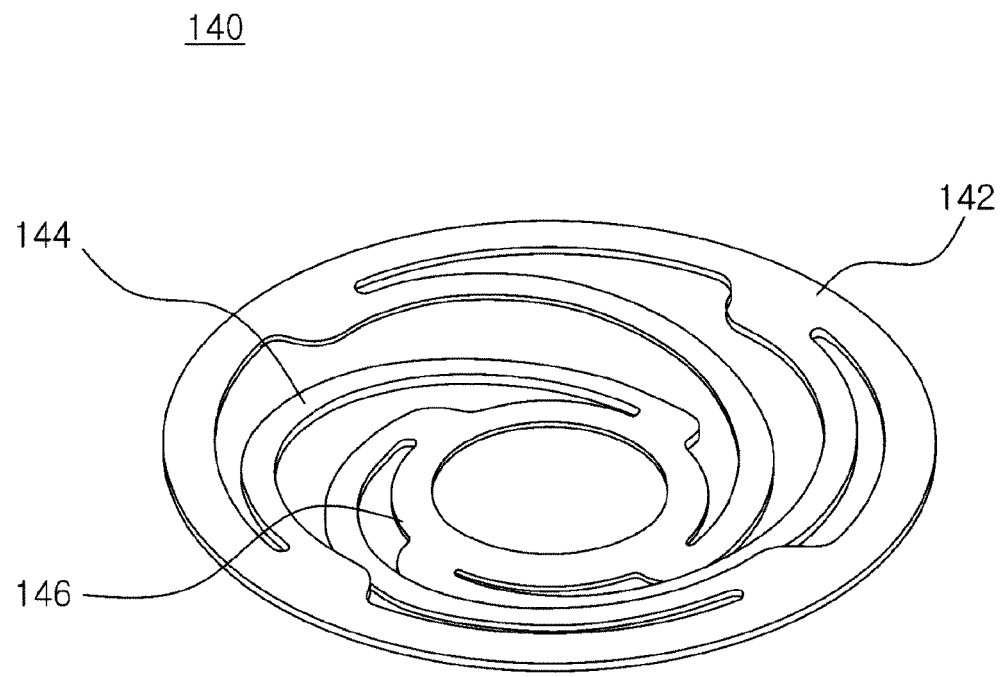
FIG. 3 is a schematic perspective view of an elastic member provided in the linear vibrator according to the embodiment of the present invention.
Figure 4:
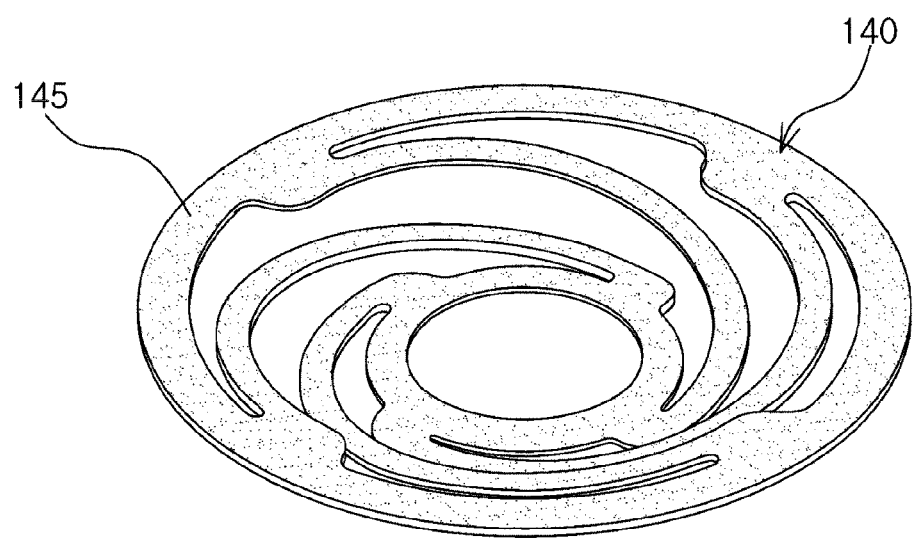
FIG. 4 is a schematic perspective view of an elastic member having a damping increasing portion attached thereto, provided in the linear vibrator according to the embodiment of the present invention.
Figure 5:
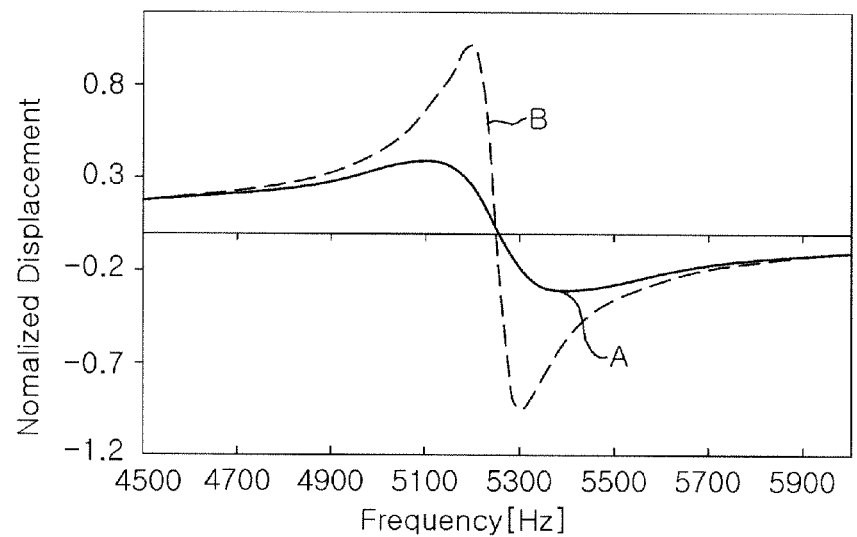
FIG. 5 is a graph showing a comparison of vibration displacement in a surging mode of the linear vibrator according to the embodiment of the present invention, with that in the case of the related art.

FIG. 1 is a schematic exploded perspective view of a linear vibrator according to an embodiment of the present invention. FIG. 2 is a schematic cross-sectional view of the linear vibrator according to the embodiment of the present invention. FIG. 3 is a schematic perspective view of an elastic member provided in the linear vibrator according to the embodiment of the present invention. FIG. 4 is a schematic perspective view of an elastic member having a damping increasing portion attached thereto, provided in the linear vibrator according to the embodiment of the present invention. FIG. 5 is a graph showing a comparison of vibration displacement in a surging mode of the linear vibrator according to the embodiment of the present invention, with that in the case of the related art.

First, in defining terms regarding directions, an outer diameter direction or inner diameter direction is a direction toward an outer circumferential surface of a case 112 from the center of the case 112 or vice versa.

Referring to FIGS. 1 through 4, a linear vibrator 100 according to an embodiment of the present invention may include a fixed part 110 forming an exterior of the linear vibrator 100, a magnet 122 of a magnetic field part 120, a vibration part 130 having a coil 132 and a mass body 134, and an elastic member 140 having a damping increasing portion 145 attached thereto.

The fixed part 110 may provide an interior space having a predetermined size, and specifically, may include the case 112 having an open bottom and a bracket 114 sealing the interior space formed by the case 112.

Here, a space accommodating the magnetic field part 120 including the magnet 122, the vibration part 130, and the like may be formed by the case 112 and the bracket 114. The case 112 and the bracket 114 may be integrally formed.

In addition, in a top surface of the case 112, at least one inflow hole 116 for disposing a magnetic fluid 126, which will be described later, on an outer circumferential surface of the magnet 122 may be formed, and the outer circumferential surface of the magnet 122 may be easily coated with the magnetic fluid 126 through the inflow hole 116.

In addition, the inflow hole 116 may allow a laser beam to penetrate therethrough, which is required when the elastic member 140 and a holder 136 of the vibration part 130 are coupled by welding.

The magnet 122 and a yoke plate 124 may constitute the magnetic field part 120 of the linear vibrator 100 according to the embodiment of the present invention, and the magnet 122 may be coupled to the top surface of the bracket 114 constituting the fixed part 110 by at least one of bonding, pressing, and welding.

The magnet 122 may have an outer diameter smaller than an inner diameter of the coil 132 coupled to the holder 136, and may be coupled to the bracket 114 to act as a fixed member.

However, an outer wall 114a that is protruded to correspond to the outer diameter of the magnet 122 may be provided on the top surface of the bracket 114, and the outer circumferential surface of the magnet 122 is inserted and fixed to an inner surface of the outer wall 114a, so that the magnet 122 and the bracket 114 may be more tightly coupled.

Here, the top surface of the magnet 122 may be coupled to the yoke plate 124 allowing magnetic flux to smoothly flow to the magnet 122 through the coil 132 generating electromagnetic force by interaction with the magnet 122.

The yoke plate 124 may be formed of a magnetic material, thereby facilitating coating of the magnetic fluid 126.

That is, the magnetic fluid 126 may be coated between the outer circumferential surfaces of the magnet 122 and the yoke plate 124 and the coil 132, and the magnetic fluid 126 may prevent abnormal vibrations of the vibration part 130.

Specifically, the magnetic fluid 126 may be disposed in a clearance formed between the magnet 122 and the coil 132 so as to facilitate a vertical movement of the vibration part 130, and may prevent the abnormal vibrations generated by the lateral or vertical movement of the vibration part 130 due to factors such as an external impact, and the like.

The magnetic fluid 126 may be a substance which converges on the magnetic flux of the magnet 122, and when the surface of the magnet 122 is coated with the magnetic fluid 126, the magnetic fluid 126 may converge at a generation point of the magnetic flux of the magnet 122 to thereby form a single ring.

Here, the magnetic fluid 126 may be obtained such that a magnetic powder is dispersed in a liquid in a colloidal state, and then a surfactant is added thereto, so that precipitation or agglomeration of the magnetic powder due to gravity, a magnetic field, or the like, may not occur. As examples of the magnetic fluid 126, triiron tetraoxide and iron-cobalt alloy particles are dispersed in oil or water, or cobalt is dispersed in toluene.

The magnetic powder may be ultra-fine powder, and allow for a unique Brownian motion of ultra-fine particles, so that a concentration of magnetic powder particles in the fluid may be maintained to be constant, even in the case of the application of an external magnetic field, gravity, centrifugal force, or the like.

In addition, the magnetic fluid 126 may fill a gap between an outer surface of the magnet 122 and an inner surface of a hollow of the coil 132, so that the vibration part 130 may vibrate smoothly or slide.

The vibration part 130 may include the coil 132 and the mass body 134, and the coil 132 and the mass body 134 may be fixed by the holder 136, and mediation of the vibration may be implemented by the elastic member 140.

That is, the vibration part 130 may be a member that vibrates vertically via the elastic member 140.

The coil 132 may be disposed to face the magnet 122, and a part of the magnet 122 may be inserted into a space formed by the coil 132.

Here, the coil 132 may have an inner diameter larger than an outer diameter of the magnet 122, and the coil 132 and the magnet 122 may be maintained in a non-contact state while the vibration part 130 moves.

In addition, the coil 132 may be coupled to a hollow inner surface of the holder 136, and induce a magnetic field therearound when a current is applied thereto in accordance to a predetermined frequency.

Here, when electromagnetic force is obtained through the coil 132, magnetic flux passing through the coil 132 from the magnet 122 may be formed in a lateral direction, and the magnetic field generated by the coil 132 may be formed in a vertical direction, so that the vibration part 130 may vibrate vertically.

Accordingly, the magnetic flux direction of the magnet 122 and the vibration direction of the vibration part 130 may be perpendicular to each other.

That is, through the application of the electromagnetic force having the same vibration frequency as a natural mechanical frequency of vibrations of the vibration part 130, the vibration part 130 may resonate and vibrate to obtain a maximum vibration quantity, and the natural frequency of vibrations of the vibration part 130 may be affected by a mass of the vibration part 130 and an elastic coefficient of the elastic member 140.

Here, current applied to the coil 132 of the vibration part 130, that is, external power having a predetermined frequency, may be supplied by a substrate 150 coupled to the vibration part 130, which will later be described.

The holder 136 may be coupled to an outer circumferential surface of the coil 132 to fixedly support the mass body 134, and may be formed to have a hollow cylindrical shape having open top and bottom.

Specifically, the holder 136 may include a cylindrical vertical portion 136a contacting one surface of each of the coil 132 and the mass body 134, and outer and inner horizontal portions 136b and 136c, respectively extended from an end of the vertical portion 136a in the outer and inner radial directions to thereby support the other surface of each of the coil 132 and the mass body 134.

An outer circumferential surface of the vertical portion 136a and a bottom surface of the outer horizontal portion 136b are brought into contact with the mass body 134 to thereby fixedly support the mass body 134, and an inner circumferential surface of the vertical portion 136a and a bottom surface of the inner horizontal portion 136c may fixedly support the coil 132.

In addition, the holder 136 may be formed of a material including iron, and formed of the same material as that of the elastic member 140 to thereby allow for tight coupling to easily be performed.

However, the material of the holder 136 and the elastic member 140 is not limited thereto, and any material may be used as long as the coupling may be easily and tightly performed.

In addition, the vertical portion 136a of the holder 136 may be formed to be higher than a bottom surface of each of the coil 132 and the mass body 134 so as to form a space therebetween, and the space may be filled with an adhesive (B), so that the coupling between the coil 132 and the mass body 134 may be more tightly performed.

The mass body 134 may be a vibration body that is coupled to the outer surface of the vertical portion 136a and the bottom surface of the outer horizontal portion 136b of the holder 136 to vibrate vertically. Here, when the mass body 134 vibrates vertically, the mass body 134 may have an outer diameter smaller than an inner diameter of the inner surface of the case 112, so as to allow for vibrations without contact within the fixed part 110.

Thus, a clearance having a predetermined size may be formed between the inner surface of the case 112 and the outer surface of the mass body 134.

The mass body 134 may be formed of a nonmagnetic material or a paramagnetic material which is not affected by a magnetic force generated by the magnet 122.

Accordingly, the mass body 134 may be formed of a material such as tungsten having a denser mass than that of steel, and this is because a resonant frequency is adjusted by increasing the mass of the vibration part 130 within the same volume to maximize a vibration quantity.

However, the material of the mass body 134 is not limited to tungsten, and various materials may be used therefor, depending on the designer's intent.

Here, in order to correct a natural frequency of vibrations in the linear vibrator 100, the mass body 134 may have a space in which a sub mass body is additionally inserted, thereby adding and subtracting the mass of the mass body 134.

The elastic member 140 as a member that is coupled to the holder 136 and the case 112 to provide elastic force to the vibration part 130 may be a component of the vibration part 130 as described above, but herein, the elastic member 140 will be described as being regarded as an independent component.

Here, the natural frequency of the vibration part 130 may be dependent on the elastic coefficient of the elastic member 140.

Specifically, the elastic member 140 may be a plate spring including a fixed end portion 142 coupled to the case 112 as the fixed part 110, a free end portion 146 coupled to the holder 136 as the vibration part 130, and at least one connection strip portion 144 connecting the fixed end portion 142 and the free end portion 146.

That is, the fixed end portion 142 may be fixed to a lower surface of the case 112, to be sealed, and the free end portion 146 may be fixed to at least one top surface of the inner horizontal portion 136c and the outer horizontal portion 136b of the holder 136.

Further, the connection strip portion 144 may have one end connected to the fixed end portion 142 and may be bent in a spiral direction to generate elastic force.

Here, the elastic member 140 may have the damping increasing portion 145 attached to a predetermined region of a surface thereof and a damping coefficient of the elastic member 140 may be increased by using the damping increasing portion 145.

Specifically, the damping increasing portion 145 may be attached to a predetermined region of the connection strip portion 144 of the elastic member 140 and may be attached to the entirety of or a part of at least one of a top surface and a bottom surface of the connection strip portion 144.

The damping increasing portion 145 may be attached to the elastic member 140 by coating and may be made of rubber.

Further, the damping increasing portion 145 may be made of a material including urethane and a thickness of the damping increasing portion 145 may be approximately several micrometers.

As described above, through the damping increasing portion 145 attached to the elastic member 140, contact between the elastic member 140 and the case 112 or the elastic member 140 and the mass body 134 in a surging mode which is a specific mode of the elastic member 140 generated in a undesired high-frequency domain may be prevented to thereby prevent the breakage of the elastic member 140 caused by noise and contact, in the linear vibrator 100 according to the embodiment of the present invention.

Further, magnetic efficiency is not changed and an operation in a resonant frequency is not influenced to thereby acquire stable linear vibrations without changes in the maximum vibration quantity.

In other words, the linear vibrator 100 according to the embodiment of the present invention generates vibrations through the application of electromagnetic force (current) having a resonant frequency corresponding to a mechanical resonant frequency determined by the vibration part 130 placed in the case 112, that is, the mass body 134, and the elastic member 140 and in this case, a signal of an undesired frequency band may be necessarily combined therewith.

Here, the necessarily combined signal of the undesired frequency band may cause abnormal vibrations of the vibration part 130 rather than normal vertical vibrations thereof, and, in particular, cause the surging mode in which only the elastic member 140 vibrates irrespective of the mass body 134.

That is, the surge mode may be a phenomenon in which only the connection strip portion 144 of the elastic member 140 is vibrated by a frequency signal corresponding to 4000 Hz to 6000 Hz which is in the high-frequency band in the undesired frequency band. The phenomenon causes contact between the elastic member 140 and the case 112 or the elastic member 140 and the mass body 134 to cause noise.

Since the surging mode may be necessarily generated as long as the elastic member 140 is provided, the vibrations of the elastic member 140 due to the surging mode need to be minimized in order to minimize the noise.

Accordingly, in the linear vibrator 100 according to the embodiment of the present invention, the vibrations of the elastic member 140 due to the surging mode are minimized by attaching the damping increasing portion 145 to the elastic member 140.

Referring to FIG. 5, a linear vibrator A having the damping increasing portion 145 attached thereto has vibration displacement significantly reduced as compared with that of a linear vibrator B according to the related art, which does not have the damping increasing portion attached thereto.

Here, FIG. 5 is a graph of verifying changes in displacement of the elastic member 140 according to resonance through a harmonic analysis by using a finite element model, in this case, it is assumed that the damping coefficient of the damping increasing portion 145 is 0.1 and the damping increasing portion 145 is coated with a thickness of 20 μm.

As shown in FIG. 5, in the high-frequency band (4000 to 6000 Hz) causing the surge mode among the undesired frequency band, the elastic member 140 having the damping increasing portion 145 attached thereto demonstrates a significantly reduced rate of changes in displacement, as compared with that in the case of the related art.

Further, the linear vibrator 100 according to the embodiment of the present invention may include the substrate 150 so as to apply power to the coil 132 and the substrate 150 may be a printed circuit board.

Here, the substrate 150 may include a through-hole 152 that allows the magnet 122 to pass therethrough so as to be in non-contact with the magnet 122 when the vibration part 130 vibrates.

That is, the through-hole 152 may prevent contact between the magnet 122 and the substrate 150 and prevent a limit in amplitude when the vibration part 130 vibrates and moves to secure the maximum vibration quantity of the vibration part 130.

Accordingly, the linear vibrator 100 according to embodiment of the present invention may implement more stable linear vibrations by using the through-hole 152.

Specifically, one end of the substrate 150 may be a free end coupled to the vibration part 130 and the other end of the substrate 150 may be a fixed end coupled to the fixed part 110.

The other end of the substrate 150 coupled to the fixed part 110 may be provided with a power connection terminal 154 for supplying power to the coil 132, and the power connection terminal 154 may be placed outside the case 112 which is the fixed part 110.

Further, a damper 160 may be provided on a surface of the substrate 150 to prevent the vibration part 130 and the bracket 114, a part of the fixed part 110, from contacting each other by the vibrations of the vibration part 130.

The damper 160 may be made of an elastic material to prevent contact caused by a linear movement of the vibration part 130 and may prevent contact noise from being generated when the vibration part 130 contacts the bracket 114 by excessive vibrations of the vibration part 130 and at the same time, prevent abrasion of the vibration part 130.

Here, the damper 160 may be made of various kinds of material, such as rubber, cork, propylene, phorone, or the like, which may absorb impacts in order to absorb external impacts applied to the case when external impacts are applied thereto.

Although the damper 160 is provided on a bottom surface of the substrate 150 in FIGS. 1 to 4, but is not limited thereto and the damper 160 may be provided on an inner sealing surface in an upper portion of the case 112 or the top surface of the bracket 114.

Figure 6:
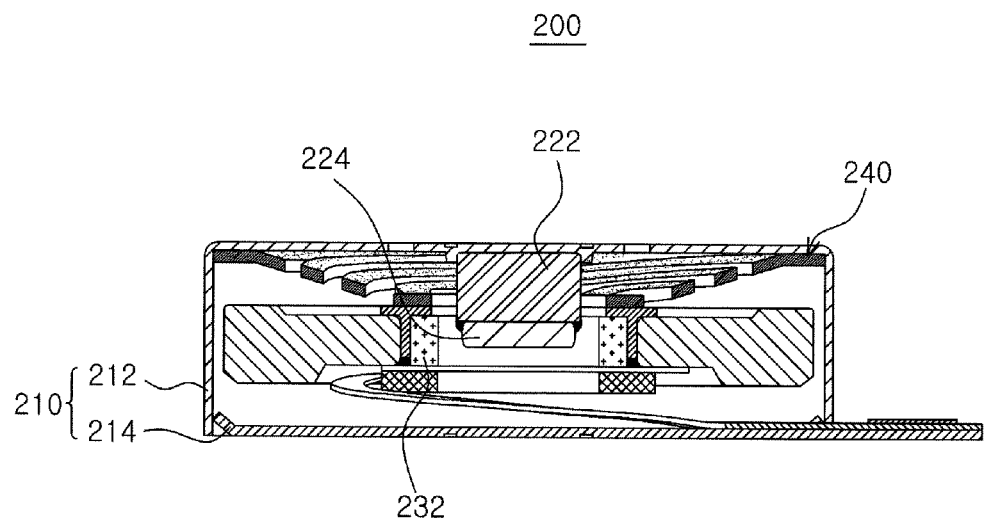
FIG. 6 is a schematic cross-sectional view of a linear vibrator according to another embodiment of the present invention.

FIG. 6 is a schematic cross-sectional view of a linear vibrator according to another embodiment of the present invention.

Referring to FIG. 6, a linear vibrator 200 according to another embodiment of the present invention may have the same configuration and effects as those of the linear vibrator 100 according to the previous embodiment of the present invention, except for the positions of a magnet 222 and a yoke plate 224, and thus, descriptions other than the positions of the magnet 222 and the yoke plate 224 will be omitted.

The magnet 222 may be coupled to a fixed part 210, but may be coupled to an inner sealing surface of a case 212, rather than a bracket 214 of the fixed part 210, unlike the linear vibrator 100 according to the previous embodiment of the present invention.

Accordingly, an elastic member 240 may include a hole in the center thereof formed to be larger than an outer diameter of the magnet 222 so as to prevent contact therewith at the time of vertical vibrations.

Here, a bottom surface of the magnet 222 may be coupled to the yoke plate 224 allowing magnetic flux to smoothly flow to the magnet 222 through a coil 232 generating electromagnetic force by interaction with the magnet 222.

Figure 7:
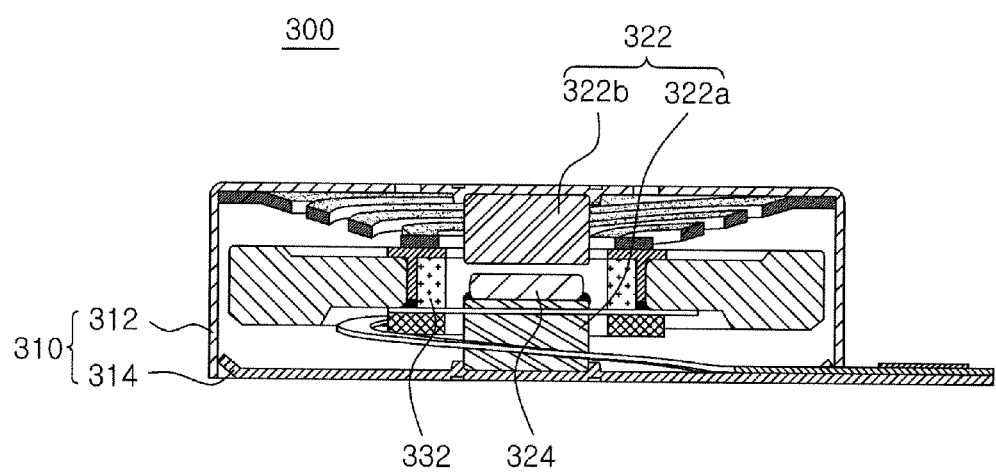
FIG. 7 is a schematic cross-sectional view of a linear vibrator according to another embodiment of the present invention.

FIG. 7 is a schematic cross-sectional view illustrating a linear vibrator according to another embodiment of the present invention.

Referring to FIG. 7, a linear vibrator 300 according to another embodiment of the present invention may have the same configuration and effects as those of the linear vibrator 100 according to the previous embodiment of the present invention, except for a magnet 322, and thus, descriptions other than a description of the magnet 322 will be omitted.

The magnet 322 may include a first magnet 322a and a second magnet 322b.

The second magnet 322b may be formed in contact with an inner sealing surface of an upper portion of a case 312 of a fixed part 310, and the first magnet 322a may be coupled to a top surface of a bracket 314.

The first and second magnets 322a and 322b may be a cylindrical permanent magnet in which an upper portion and a lower portion of each of the first and second magnets 322a and 322b may be magnetized in the vertical direction as different poles so as to generate a magnetic field to thereby generate magnetic force having a predetermined strength. In addition, the first and second magnets 322a and 322b may be adhered via an adhesive or the like, to be fixedly disposed on the inner sealing surface of the upper portion of the case 312 and the top surface of the bracket 314.

The first and second magnets 322a and 322b may be positioned in a manner such that the same poles face each other to generate magnetic force, and may be spaced apart from each other.

By the first and second magnets 322a and 322b disposed in the manner such that the same poles face each other, lines of magnetic force existing between the first and second magnets 322a and 322b may be spread in the outer radial direction, thereby improving magnetic efficiency. In particular, magnetic force may be focused on a place in which a coil 332, positioned in the outer circumferential portion of the first and second magnets 322a and 322b, is linked, such that, if the same amount of current is consumed in the same volume, electromagnetic force may be greatly implemented in comparison with that in the case of a single magnet, and a larger quantity of vibrations may be implemented.

However, the magnet 322 is not limited to being formed as the first and second magnets 322a and 322b, and two or more magnets may be provided as long as the polarities thereof can be disposed to face each other.

Here, the top surface of the first magnet 322a may be coupled to a yoke plate 324 allowing magnetic flux to smoothly flow to the first magnet 322a through the coil 332 generating electromagnetic force by interaction with the first magnet 322a.

However, the yoke plate 324 may be disposed between the first magnet 322a and the second magnet 322b.

Through the embodiments, by attaching the damping increasing portion 145 to each of the elastic members 140 and 240, the breakage of the elastic members 140 and 240 may be prevented in advance due to noise and contact by preventing contact between the elastic members 140 and 240 and the cases 112, 212, and 312 or the elastic members 140 and 240 and the mass body 134 in the surging mode, which is the specific mode of the elastic members 140 and 240 generated in the undesired high-frequency domain.

Further, magnetic efficiency is not changed and the operation in the resonant frequency is not influenced, such that stable linear vibrations may be obtained, without changes in the maximum vibration quantity.

As set forth above, with a linear vibrator according to embodiments of the present invention, the breakage of an elastic member due to noise and contact may be prevented in advance by preventing contact between the elastic member and a case or the elastic member and a mass body in a surging mode, which is a specific mode of the elastic member generated in a undesired high-frequency domain.

Further, magnetic efficiency is not changed and an operation in a resonant frequency is not influenced, such that stable linear vibrations may be obtained, without changes in the maximum vibration quantity.

While the present invention has been shown and described in connection with the embodiments, it will be apparent to those skilled in the art that modifications and variations can be made without departing from the spirit and scope of the invention as defined by the appended claims.

What is claimed is:

1. A linear vibrator, comprising:
a fixed part providing an interior space having a predetermined size;
at least one magnet disposed in the interior space and generating magnetic force;
a vibration part including a coil facing the magnet and generating electromagnetic force through interaction with the magnet and a mass body; and
an elastic member coupled to the fixed part and the vibration part to mediate vibrations of the vibration part and having a damping increasing portion attached to a predetermined region of a surface thereof, wherein:
the elastic member includes a fixed end portion coupled to the fixed part, a free end portion coupled to the vibration part, and at least one connection strip portion providing elastic force by connecting the fixed end portion and the free end portion to each other, and
the damping increasing portion is attached to a predetermined region of the at least one connection strip portion.

2. The linear vibrator of claim 1, wherein the damping increasing portion is coated on the elastic member.

3. The linear vibrator of claim 1, wherein the damping increasing portion is made of a rubber material.

4. The linear vibrator of claim 1, wherein the damping increasing portion includes urethane.

5. The linear vibrator of claim 1, wherein the fixed part includes a case providing the interior space and having an open bottom and a bracket sealing the interior space, and
the magnet is coupled to a surface of the bracket or a surface of the case.

6. A linear vibrator, comprising:
a fixed part providing an interior space having a predetermined size;
at least one magnet disposed in the interior space and generating magnetic force;
a vibration part including a coil facing the magnet and generating electromagnetic force through interaction with the magnet and a mass body;
an elastic member coupled to the fixed part and the vibration part to mediate vibrations of the vibration part and having a damping increasing portion attached to a predetermined region of a surface thereof; and
a substrate having one end coupled to the vibration part as a free end and the other end coupled to the fixed part as fixed end, so as to apply power to the coil.

7. A linear vibrator, comprising:
a fixed part providing an interior space having a predetermined size;
at least one magnet disposed in the interior space and generating magnetic force;

a vibration part including a coil facing the magnet and generating electromagnetic force through interaction with the magnet and a mass body; and an elastic member coupled to the fixed part and the vibration part to mediate vibrations of the vibration part and having a damping increasing portion attached to a predetermined region of a surface thereof, wherein:

the fixed part includes a case providing the interior space and having an open bottom and a bracket sealing the interior space, and the magnet includes a plurality of magnets and the plurality of magnets are coupled to each of one surface of the case and one surface of the bracket.

8. A linear vibrator, comprising:

a fixed part providing an interior space having a predetermined size and including a case having an open bottom and a bracket sealing the interior space;

at least one magnet disposed in the interior space and generating magnetic force;

a vibration part including a holder fixedly supporting a coil disposed to face the least one magnet to generate electromagnetic force through interaction with the magnet and a mass body; and an elastic member coupled to the fixed part and the vibration part to mediate vibrations of the vibration part and having a damping increasing portion made of a rubber material, coated on a predetermined region of a surface thereof wherein:

the elastic member includes a fixed end portion coupled to the fixed part, a free end portion coupled to the vibration part, and at least one connection strip portion providing elastic force by connecting the fixed end portion and the free end portion to each other, and the damping increasing portion is attached to a predetermined region of the at least one connection strip portion.

\* \* \* \* \*